United States Patent

[11] 3,634,772

[72] Inventor Joel Katz
Los Angeles, Calif.
[21] Appl. No. 103,971
[22] Filed Jan. 5, 1971
[45] Patented Jan. 11, 1972
[73] Assignee The United States of America as represented by the Secretary of the Air Force

[54] DIGITAL BAND-PASS DETECTOR
2 Claims, 6 Drawing Figs.

[52] U.S. Cl. ........................................................ 328/138,
328/37, 328/134, 328/141, 328/94
[51] Int. Cl. ........................................................ H03d 3/00
[50] Field of Search ............................................ 328/37,
138, 140, 141, 133, 134, 94

[56] References Cited
UNITED STATES PATENTS
3,571,522 3/1971 Cox ............................ 328/138 X
OTHER REFERENCES
IBM Technical Disclosure Bulletin " Frequency Deviation Indicator" By Seith Vol. 4, No. 11, 4/62.

*Primary Examiner*—John S. Heyman
*Attorneys*—Harry A. Herbert, Jr. and George Fine

ABSTRACT: A digital band-pass detector is provided which utilizes the autocorrelation properties of a square wave signal to provide a DC output only at a desired signal frequency, $f_o$. Any number of individual autocorrelations can be combined to yield an overall selectivity by using appropriate values of delay $\tau$ for each correlation.

INVENTOR
JOEL KATZ
BY Harry A. Herbert Jr. and George Fine
ATTORNEYS

INVENTOR.
JOEL KATZ
BY Harry A. Herbert Jr. and George Fine
ATTORNEYS

DIGITAL BAND-PASS DETECTOR

BACKGROUND OF THE INVENTION

This invention relates to a band-pass filter followed by a detector and more particularly to a digital band-pass detector. This invention provides the function of a band-pass filter followed by an envelope detector. The invention replaces a doppler channel in a doppler radar receiver. Normally, a band-pass crystal filter followed by an envelope detector make up such a channel. The invention can also be used as the detector (last) stage in an IF strip in any AM receiver.

The prior method used a crystal or LC filter to make up each doppler channel. These analog filters were expensive, had very critical temperature tolerances, took up a relatively large volume, and added considerable weight to the receiver. However, the invention uses only digital circuitry. Because the new device is digital, it is inherently insensitive to wide temperature changes, requires extremely small volume (microelectronic chips with hybrid thick film techniques), has negligible weight, and is much cheaper to produce than the analog filter. The center frequency and bandwidth are determined by the clock frequency and the element delays. Therefore, no tuning is required and no ageing can occur.

An entire bank of doppler radar receiver channels can be made up using the invention in each channel. The clock frequency would be different for each channel, but otherwise they would be identical. Thus, LSI (large-scale integration) microelectronic techniques can be used to produce a channel on a single microelectronic chip (using MOS-FET devices). The benefits derived by using the digital band-pass detector increase as the number of doppler channels increase. It may also be possible to implement a set of doppler channels using a single clock frequency to all the delay elements. Such an arrangement would require multiple sets of taps on the delay line, one set for each channel. This configuration would eliminate the generation of a number of clock frequencies.

SUMMARY OF THE INVENTION

A digital band-pass detector is provided which uses autocorrelation properties of a square wave signal to provide a DC output only at a desired signal frequency, $f_o$. Any number of individual correlations can be combined to yield an overall selectivity by using appropriate values of delay, $\tau$, for each correlation. For example, in a four-section implementation each section includes a predetermined delay and a phase detector. The first section has a delay, $\tau$, which yields 180° phase shift at the desired center frequency of the band-pass response. This phase-shifted version of the input signal (square wave) is inverted 180° and compared with the original input signal in a full wave digital phase detector. The output of the full wave digital phase detector is a variable duty cycle pulse train at signal repetition rate, $f_{in}$. Relative phase is measured by the DC component of this output pulse train. The response of the first-section phase detector output (DC component) is a function of signal frequency. The output of the second section has twice the number of 180° response points since the delay is $2\tau$ in the second section. The third and fourth sections have preselected delays of $4\tau$ and $8\tau$, respectively.

When the responses of the first, second, third, and fourth sections are combined together they produce the response of the final output which is at the desired signal frequency, $f_o$.

DESCRIPTION OF PREFERRED EMBODIMENT

Figure 1:
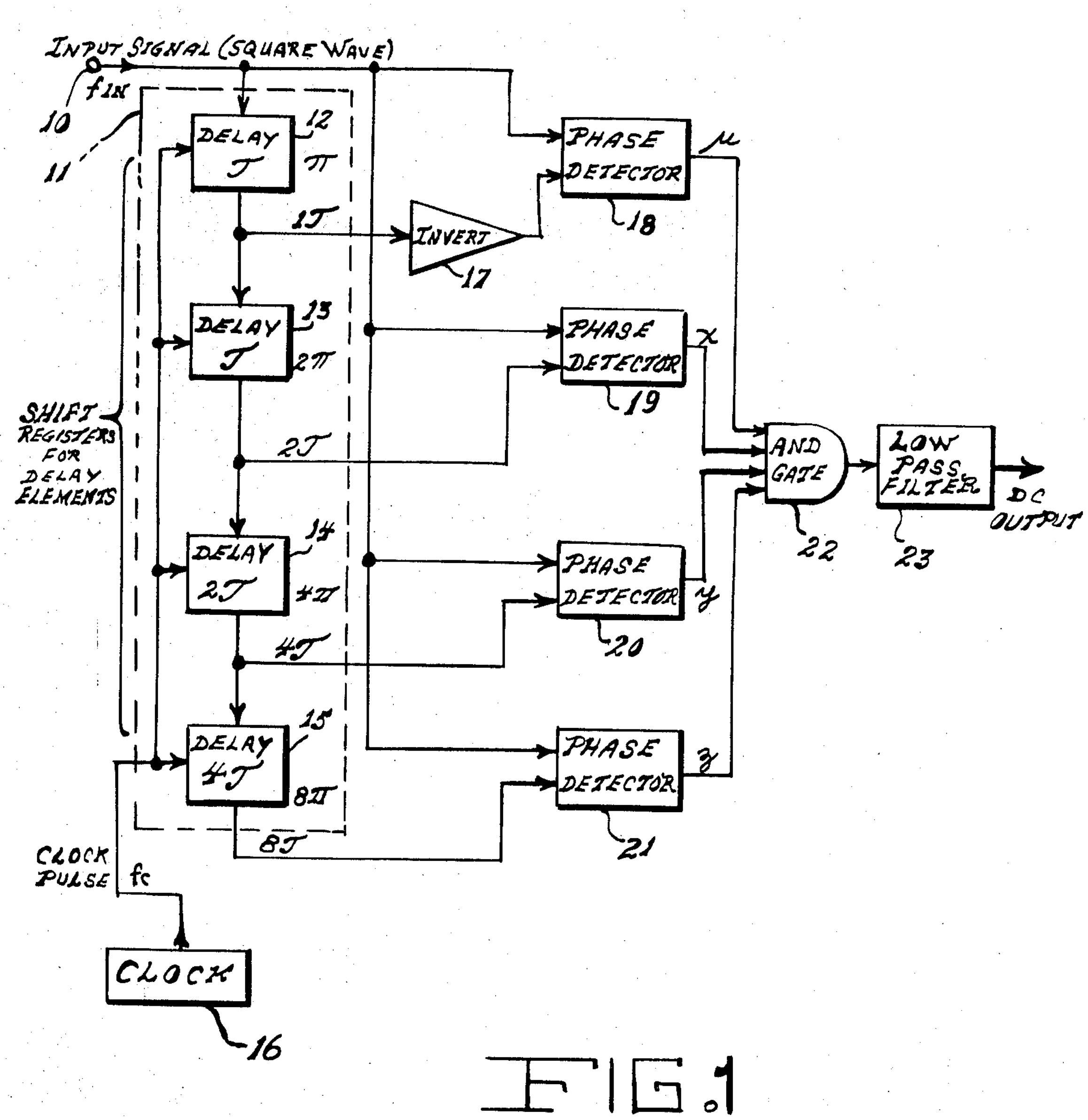
FIG. 1 shows in block diagram form the digital band-pass detector of this invention in a four-section embodiment.

Now referring in detail to FIG. 1, there is shown for purposes of clarity component 11 which is comprised of digital shift registers utilized as series delay elements 12, 13, 14 and 15. Delay elements 12, 13, 14 and 15 have preselected delays of $\tau$, $\tau$, $2\tau$, and $4\tau$, respectively, to provide at the output thereof delays of $\tau$, $2\tau$, $4\tau$ and $8\tau$, respectively. Delay elements 12, 13, 14 and 15 receive clock pulses of a predetermined frequency, $f_c$, from clock 16. Digital shift registers utilized as delay elements are conventional in the art.

Figure 2:
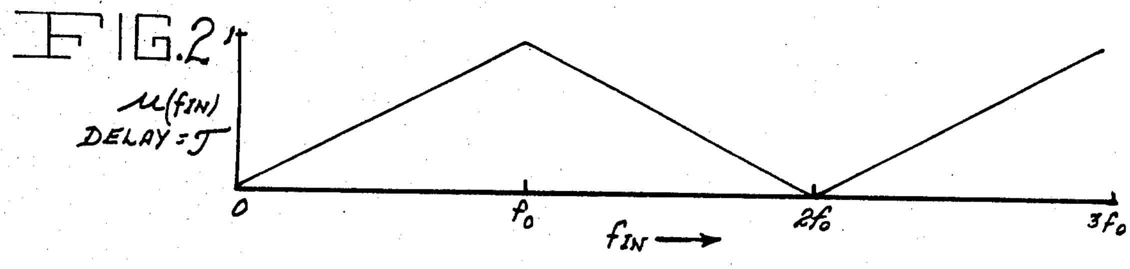
FIG. 2 shows the response of the first section.

Terminal 10 receives an input signal in the form of a square wave. The input signal is fed to delay element 12 which provides in response to a clock pulse an output signal having delay $\tau$ and phase, $\pi$. The output signal is fed to 180° inverter 17. Full wave digital phase detector 18 receives a pair of inputs, one having the original input signal and the other the inverted signal. The output of full wave digital phase detector 18 is shown at line $u$ and may be referred to as the output for the first section. Thus, the first section has a delay, $\tau$, which yields 180° phase shift at the desired center frequency of the band-pass response. This phase-shifted version of the input signal is inverted (independent of frequency) 180° and compared with the original signal in phase detector 18. The output of the full wave digital phase detector 18 is a variable duty cycle (0–100 percent) pulse train at signal repetition rate, $f_{in}$. Relative phase is measured by the DC component of this output pulse train. The response of the first-section phase detector output (DC component) is a function of signal frequency for a delay of $\tau$ seconds and the curve thereof is shown in FIG. 2.

Figure 3:
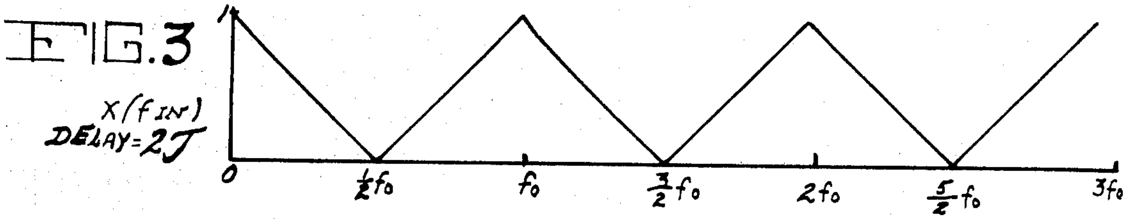
FIG. 3 shows the response of the second section.

The output signal from delay element 12 is fed to delay element 13 which in response to a clock pulse provides an output signal with a delay of $2\tau$ and a phase of $2\pi$. Full wave phase detector 19 simultaneously receives a pair of inputs, one being the output signal from delay element 13 and the other being the original input signal. The output of phase detector 19 is shown in line $x$ which may be referred to as the output signal from the second section. The output of the second section has twice the number of 180° phase response points since the delay is $2\tau$ in the second section. The response of the second section is shown in the curve of FIG. 3.

Figure 4:
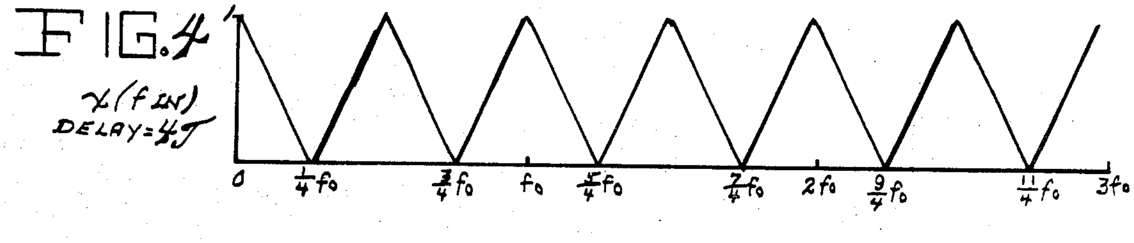
FIG. 4 shows the response of the third section.

The output signal from delay element 13 has a delay of $2\tau$ and phase of $2\pi$ and it is fed to delay element 14 and in response to a clock pulse provides an output signal having a delay of $4\tau$ and phase of $4\pi$. Full wave digital phase detector 20 receives simultaneously the output signal from delay element 14 and the original input signal and in response thereto provides an output signal on line $y$ which may be referred to as the output signal of the third section. The output signal of the third section has a response as shown in the curve of FIG. 4.

Figure 5:
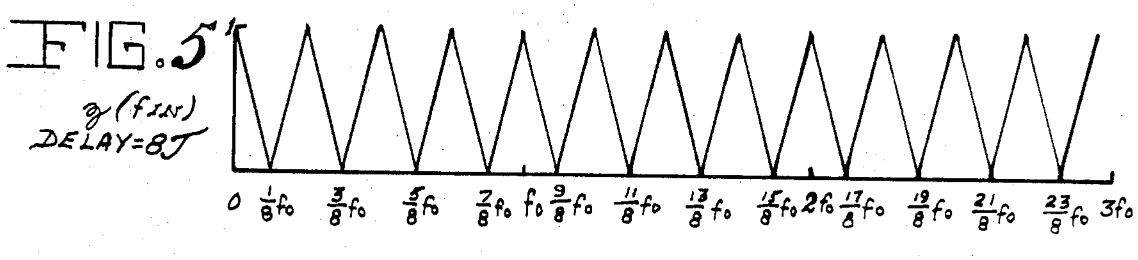
FIG. 5 shows the response of the fourth section.

The output signal from delay element 14 having a delay of $4\tau$ and phase of $4\pi$ is fed to delay element 15 which will in response to a clock pulse provide an output signal having a delay of $8\tau$ and phase of $8\pi$. Full wave digital phase detector 21 simultaneously receives the output signal from delay element 15 and the original signal and provides an output signal at line $z$ which may be referred to as the output signal for the fourth section. The response of the output signal for the fourth section is shown by the curve of FIG. 5.

Figure 6:
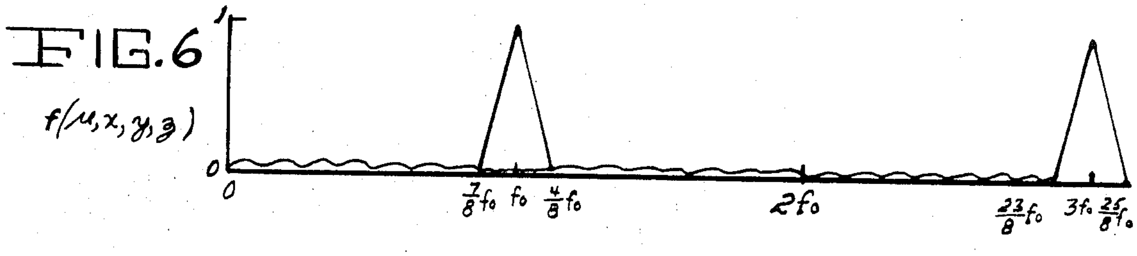
FIG. 6 shows the responses of the outputs of the four sections when multiplied together to provide the final output.

The output signals from lines $u$, $x$, $y$ and $z$ as illustrated in FIGS. 2, 3, 4 and 5 are fed to AND-gate 22 and are combined together to produce the response of the final output shown in the curve of FIG. 6.

The only analog element required is low-pass filter 23 at the output which removes the signal frequency ripple component from the DC desired output component.

The amount of delay required is found from $\tau = -d\phi/dw$, and noting that the phase detector response goes from a maximum to a minimum as related phase changes 180°. Therefore, the response of the first section (which is inverted with respect to those of the other sections) must be at a maximum at $f_o$, the band center of the response, when $d\phi = -\pi$ radians. Hence, $\tau = -(-\pi/w_o) = \pi/2\pi f_o = 1/2\pi f_o$.

The clock pulse frequency, $f_c$, needed to obtain a delay, $\tau$, using N shift register bits is found from $f_c=N/\tau$. It is noted that $f_c/f_{in}>>1$ to avoid excessive phase jitter out of each shift register.

I claim:

1. A digital band-pass filter detector comprising first, second, third and fourth delay elements in the form of shift registers, having preselected delays of $\tau$, $\tau$, $2\tau$, and $4\tau$, respectively, clock means providing a clock pulse of predetermined frequency to said delay elements, the first of said delay elements receiving an input signal in the form of a square wave, said first delay element providing a first output signal with a delay of $\tau$, the second of said delay elements receiving said first output signal and providing a second output signal with a delay of $2\tau$, the third of said delay elements receiving said second output signal and providing a third output signal with a delay of $4\tau$, the fourth of said delay elements receiving said third output signal and providing a fourth output signal with a delay of $8\tau$, means to invert said first output signal 180°,a first full wave digital phase detector receiving simultaneously said inverted first output signal and said input signal to provide a first phase detected signal, a second full wave detector receiving simultaneously said second output signal and said input signal to provide a second phase detected signal, a third full wave digital detector receiving simultaneously said third output signal and said input signal to provide a third phase detected signal, a fourth full wave digital phase detector receiving simultaneously said fourth output signal and said input signal to provide a fourth phase detected signal, and AND gate means receiving simultaneously said first, second, third, and fourth phase detected signals and in response thereto providing a filtered DC output signal.

2. A digital band-pass filter as described in claim 1 further including a low-pass filter to remove ripples from said filtered DC output signal.

* * * * *